United States Patent Office.

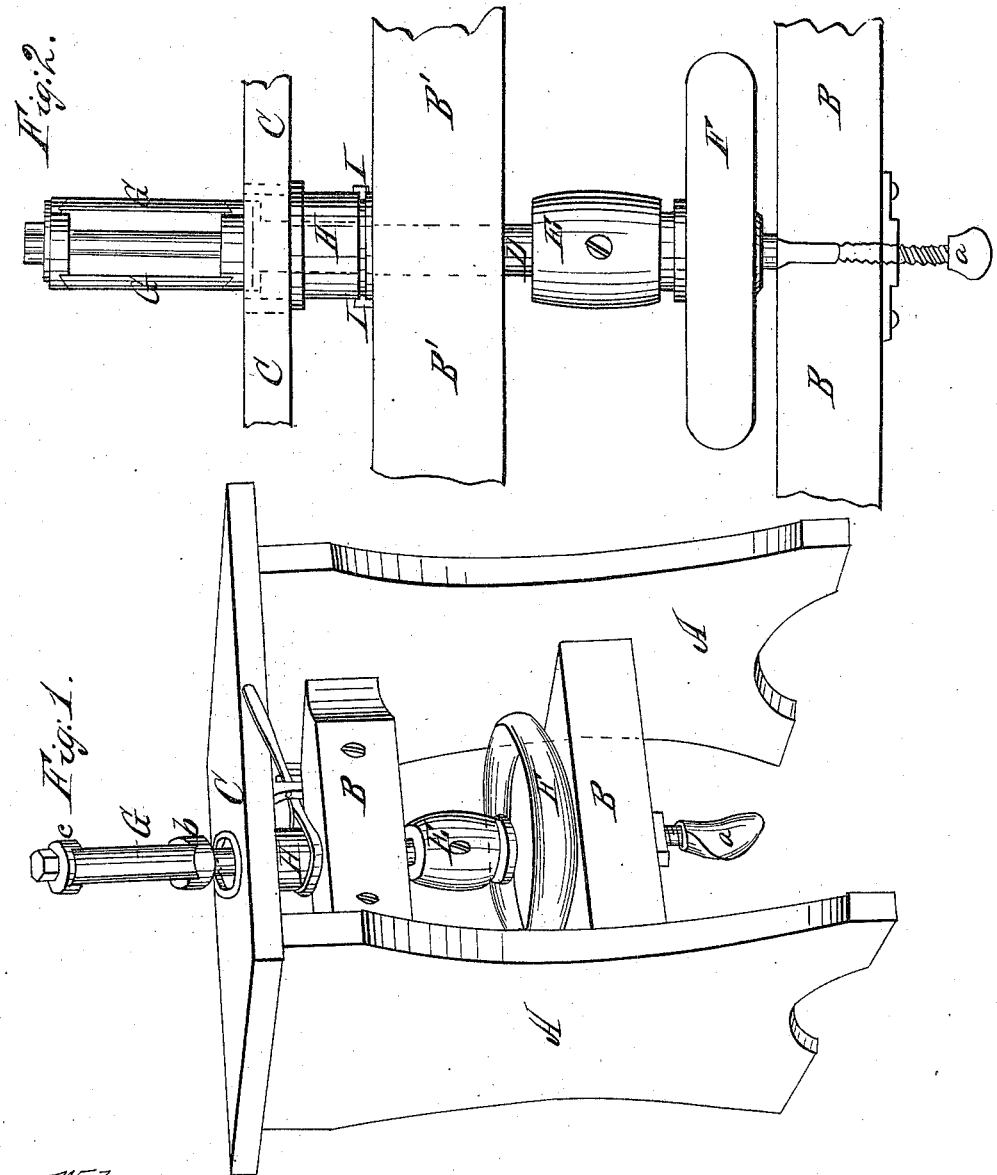

S. M. HAMILTON, OF BALTIMORE, MARYLAND.

Letters Patent No. 81,776, dated September 1, 1868.

IMPROVEMENT IN PLANING-MACHINES.

The Schedule referred to in these Letters Patent and making part of the same.

TO ALL WHOM IT MAY CONCERN:

Be it known that I, S. M. HAMILTON, of Baltimore, in the county of Baltimore, and State of Maryland, have invented a new and useful Improvement in Wood-Working Machines; and I do hereby declare that the following is a full, clear, and exact description of the same, reference being had to the annexed drawings, making part of this specification, in which—

Figure 1 is a perspective view, showing my improvement attached.

Figure 2 is a front elevation of the same, with the uprights or ends of the frame and portions of the cross-beams or supports of the mandrel broken away.

The same letters in both figures indicate identical parts.

This invention relates to an improvement in wood-working machines, and it consists in providing a movable or adjustable guide which immediately surrounds the mandrel of the machine, and is so arranged as to move up and down freely thereon, so as to determine the position of the material to be worked with reference to the cutters. In the present instance I cut away a portion of the table immediately surrounding the vertical mandrel of the machine, and supply its place with a circular movable or adjustable guide, which embraces the shaft, and is made so as to be moved up or down by means of a lever, and independent of the table or of the mandrel.

A A are the ends of the frame, upon which the parts of the machine rest. They may be of wood or metal, as preferred by the constructor.

B B' are cross-beams or pieces screwed to the ends A A, and which form the bearings for the mandrel D. These cross-beams are located at a sufficient distance apart to permit the placing, upon that portion of the mandrel or shaft which is between them, a pulley, E, over which the belt which drives the machine passes, and a small balance-wheel, F, for steadying the motion of the machine.

C is the table, which is secured to the tops of the end-pieces A A by being bolted or otherwise fastened thereto. Through the centre of this table the mandrel D passes.

D is the mandrel or shaft of the machine, which has its bearings in or upon the cross-beams or pieces B and B', and which carries upon its central portion the pulley E and the fly-wheel F. This shaft is extended through and above the table for a distance equal to the length of the cutter-head, which is formed by securing to the shaft D two heads or flanges $b$ and $c$, of a diameter sufficient to receive, in slots cut in them, the knives G G, as shown in fig. 2.

The lower end of this shaft passes down through the cross-piece B, to the under side of which a plate, $d$, is bolted, which has a hole tapped through it to receive a set-screw, $d$, by which the shaft D, and the cutter-head upon its upper end, may be raised or lowered, as occasion may require.

H is the adjustable guide, which surrounds the shaft, and is circular or of any other desired outline, and is arranged to fit nicely in an aperture cut in table C. The lower portion of this guide has a groove turned in it, to receive the forked ends of lever I, which enter therein, and which, when the opposite end of said lever is depressed, serves to raise the movable guide above the surface of the table, the object being to regulate the work to be planed or cut, with reference to the knives of the cutting-head.

I is the lever with which the guide is operated, having its fulcrum in suitable supports secured to the table C in such a manner, that, as the outer end of said lever is depressed, the guide may be elevated to the desired position, and there retained by a screw which passes down through the table C, and rests upon said outer end of the lever.

The operation of that portion of this device which constitutes my invention, is as follows: When the mandrel, with its cutter-head, has been adjusted, by means of the set-screw $a$, to any desired position, and it becomes necessary to adjust the guide in a different position with reference to the knives or the cutting-head, I raise or lower the guide H, by means of the lever I, to the required position. It will be observed that this position of the guide H may be changed at any time, whether the machine is in motion or not, and also that it may be used to cut irregular lines upon whatever may be passing through it.

Having thus described my invention, what I claim, and desire to secure by Letters Patent, is—

The vertically-moving guide H, constructed and arranged substantially in the manner and for the purpose shown and described.

In testimony whereof, I have signed my name to this specification in the presence of two subscribing witnesses.

S. M. HAMILTON.

Witnesses:
W. H. HAYWOOD,
A. RUPPERT.